(12) United States Patent
Ishiwata

(10) Patent No.: US 9,310,548 B2
(45) Date of Patent: Apr. 12, 2016

(54) LIQUID CRYSTAL DISPLAY DEVICE

(71) Applicant: Japan Display Inc., Tokyo (JP)

(72) Inventor: Suguru Ishiwata, Tokyo (JP)

(73) Assignee: Japan Display Inc., Tokyo (JP)

( * ) Notice: Subject to any disclaimer, the term of this patent is extended or adjusted under 35 U.S.C. 154(b) by 27 days.

(21) Appl. No.: 14/200,463

(22) Filed: Mar. 7, 2014

(65) Prior Publication Data

US 2014/0267972 A1      Sep. 18, 2014

(30) Foreign Application Priority Data

Mar. 12, 2013   (JP) ................. 2013-048680

(51) Int. Cl.
  *G02F 1/1335* (2006.01)
  *F21V 8/00* (2006.01)
(52) U.S. Cl.
  CPC .......... *G02B 6/005* (2013.01); *G02F 1/133608* (2013.01)
(58) Field of Classification Search
  CPC .......... G02B 6/005; G02F 1/133608
  USPC ........................................ 349/58–67
  See application file for complete search history.

(56) References Cited

U.S. PATENT DOCUMENTS

| 7,750,992 B2 | 7/2010 | Kang et al. | |
| 7,864,258 B2 * | 1/2011 | Cho et al. | 349/58 |
| 2007/0091222 A1 * | 4/2007 | Huo | G02B 6/0086 349/58 |
| 2010/0165232 A1 * | 7/2010 | Park et al. | 349/58 |
| 2013/0229827 A1 * | 9/2013 | Takase | 362/609 |

FOREIGN PATENT DOCUMENTS

JP      2004-272266 A      9/2004

* cited by examiner

*Primary Examiner* — Charles Chang
(74) *Attorney, Agent, or Firm* — Ulmer & Berne LLP

(57) ABSTRACT

A liquid crystal display device includes a liquid crystal display panel and a backlight device. The backlight device includes: a light guide for emitting a planar light beam, a first optical sheet disposed on a back side of the light guide, and an optical sheet group disposed on an irradiation-surface side of the light guide and including a plurality of optical sheets arranged in stacked relation. Periphery parts of the first optical sheet and at least one second optical sheet of the optical sheet group are bonded together to form a bag shape, and the light guide and the other optical sheets are retained in the bag-like body formed of the first optical sheet and the second optical sheet.

12 Claims, 5 Drawing Sheets

LIQUID CRYSTAL DISPLAY DEVICE

CLAIM OF PRIORITY

The present application claims priority from Japanese Patent Application JP2013-048680 filed on Mar. 12, 2013, the content of which is hereby incorporated by reference into this application.

BACKGROUND

The present invention relates to a liquid crystal display device. Particularly, the invention relates to a technique of preventing the invasion of foreign substance such as mote and dust into a backlight device which is disposed on a back side of a liquid crystal display panel and irradiates the liquid crystal display panel with light.

A conventional liquid crystal display device has a structure, as shown in FIG. 6, where a mold member MD formed of a resin member is disposed in a lower frame LF which is a metal member shaped like a box open on one side along a side wall and where the mold member MD retains a liquid crystal display panel PNL and a backlight device BU at predetermined positions. Particularly, the liquid crystal display device shown in FIG. 6 has the structure where a reflection sheet RF, a light guide LG, an optical sheet group OS and an unillustrated light source that constitute the backlight device BU are disposed on a bottom side of the mold member MD. On the other hand, the liquid crystal display panel PNL has a structure where an unillustrated liquid crystal is sealed between a first substrate SUB1 and a second substrate SUB2 and where polarizing plates PL1, PL2 are bonded to back and top sides thereof, respectively. The liquid crystal display panel PNL is mounted on an upper side of the mold member MD and is irradiated with a backlight beam from the backlight device BU. The liquid crystal display panel PNL and the backlight device BU are configured to be supported by a step part formed on an inner periphery of the mold member MD and an upper frame UF fitted on the lower frame UF so as to be retained at predetermined positions. Hence, the conventional liquid crystal display device has the structure, as shown in FIG. 6, where the upper frame UF is formed with an opening corresponding to a display area and a clearance is formed between the upper frame UF and the liquid crystal display panel PNL. Accordingly, the conventional liquid crystal display device has a problem that a foreign substance DS such as mote and dust intrudes through this clearance as indicated by an arrow 'a'.

According to the structure of the conventional liquid crystal display device, the liquid crystal display panel PNL and the backlight device BU are retained at the predetermined positions by means of the step part formed at the mold member MD and the like. In conjunction with vibrations and the like of the liquid crystal display device, therefore, the foreign substance DS invading the liquid crystal display device intrudes further into the depth through clearance between the mold member MD and the liquid crystal display panel PNL, clearance between the mold member MD and the optical sheet group OS and the like, as indicated by arrows 'b', 'c'. As a result, as shown in FIG. 6, the backlight device BU suffers the invasion of foreign substance DS in between the sheets constituting the optical sheet group OS, or between the light guide LG and the optical sheet group OS.

This invading foreign substance DS detrimentally intercepts planar light beam emitted from the light guide LG. Particularly in the case of the foreign substance DS intruding in between the optical sheets, the foreign substance DS is magnified (emphasized) so that a light portion intercepted by the foreign substance DS (intercepted light area) is projected on the liquid crystal display panel PNL as more magnified (emphasized). In a case where such a backlight beam containing the light portion intercepted by the foreign substance DS is made incident, the light portion intercepted by the foreign substance DS appears as a black spot in a display image. That is, the foreign substance causes a so-called black spot failure, display irregularities and the like, significantly lowering the quality (display grade) of the display image.

As the technique for preventing the invasion of foreign substance into the liquid crystal display device, there is known a technique set forth in, for example, JP-A No. 2004-272266 (Patent Literature 1) or U.S. Pat. No. 7,750,992 (Patent Literature 2) corresponding to the above. According to the technique set forth in Patent Literature 1 or Patent Literature 2, the display device has a structure which includes a first casing having a box-like shape open at the top, and a liquid-crystal display panel support member having a frame-like shape and disposed in the first casing in conformity with an inner periphery thereof. This liquid-crystal display panel support member is formed with a groove (engagement groove) and a step part at a portion conforming to the inner periphery of the first casing such that the engagement groove engages with a fixing part projected from the optical sheet while the step part supports the liquid crystal display panel. In this structure, a surface of the step part on which the liquid crystal display panel is mounted is formed with a belt-like projection for prevention of foreign-substance invention (first foreign-substance invasion preventing part) while a second foreign-substance invasion preventing part, which is formed independently from the liquid-crystal display panel support member, is disposed at a formation position of the engagement groove so as to prevent the invasion of foreign substance from the engagement groove.

SUMMARY

As a method for preventing the invasion of the foreign substance DS into the backlight device BU, there is known a method, as shown in FIG. 7 for example, which is adapted to prevent the invasion of foreign substance DS by fixing the upper frame UF and the liquid crystal display panel PNL together with a double-faced tape TP1 applied along the opening of the upper frame UF and by fixing the back side of the liquid crystal display panel PNL to the mold member MD with a double-faced tape TP2. However, the structure shown in FIG. 7 fails to prevent the invasion of foreign substance DS through minute clearance between the upper frame UF and the lower frame LF. Hence, there has been a demand for another method.

On the other hand, the technique disclosed in Patent Literature 1 or Patent Literature 2 has not given any consideration on the invasion of foreign substance through the minute clearance between the first foreign-substance invasion preventing part formed at the liquid-crystal display panel support member supporting the liquid crystal display panel from the back side and the liquid crystal display panel and the minute clearance between the second foreign-substance invasion preventing part and the liquid crystal display panel.

In view of these problems, the invention has been accomplished and has an object to provide a liquid crystal display device capable of preventing the invasion of foreign substance such as mote and dust into the backlight device.

(1) A liquid crystal display device according to an aspect of the invention for achieving the above object comprises: a liquid crystal display panel; and a backlight device for irradiating the liquid crystal display panel with a planar backlight beam from a back side of the liquid crystal display panel, the backlight device including: a light source; a light guide which converts light from the light source to the planar light beam and emits the planar light beam; an optical sheet disposed on a back side of the light guide; and an optical sheet group which is disposed on an irradiation-surface side of the light guide emitting the planar light beam and includes a plurality of optical sheets arranged in stacked relation, the liquid crystal display device having a structure wherein out of the optical sheets disposed on the back side and the irradiation side of the light guide, at least one first optical sheet disposed on the back side of the light guide and at least one second optical sheet of the optical sheet group disposed on the surface side of the light guide are each formed to have a larger outside configuration than at least the light guide and the other optical sheets, and periphery parts of the first optical sheet and the second optical sheet are bonded together to form a bag shape, and the light guide and the other optical sheets are retained in the bag-like body formed of the first optical sheet and the second optical sheet.

(2) A liquid crystal display device according to an aspect of the invention for achieving the above object comprises: a liquid crystal display panel; a backlight device for irradiating the liquid crystal display panel with a planar backlight beam from a back side of the liquid crystal display panel; and a mold member for retaining the backlight device at a predetermined position, the backlight device including: a light source; a light guide which converts light from the light source to the planar light beam and emits the planar light beam; an optical sheet disposed on a back side of the light guide; and an optical sheet group which is disposed on an irradiation-surface side of the light guide emitting the planar light beam and includes a plurality of optical sheets arranged in stacked relation, the mold member including: a backside part for covering a back side of the backlight device; a side wall part for enclosing the backlight device; and a projecting part which projects from the side wall part toward an irradiation region of the backlight and is formed with an opening along the backlight irradiation region, the liquid crystal display device having a structure wherein at least the light guide, the optical sheet disposed on the back side of the light guide and the optical sheet group are disposed in the mold member, out of the optical sheet group, an optical sheet disposed on the farthest, outermost side from the light guide is formed to have an outside configuration larger than at least a width of the opening of the projecting part, and a periphery part of the optical sheet and a periphery part of the projecting part are disposed along the opening in overlapping relation, and the optical sheet disposed on the farthest, outermost side from the light guide covers the opening of the projecting part from an inner side thereof.

According to the invention, the invasion of foreign substance such as mote and dust into the backlight device can be prevented.

Other effects of the invention will become apparent from the whole description of the invention.

DESCRIPTION OF THE PREFERRED EMBODIMENTS

Figure 1:
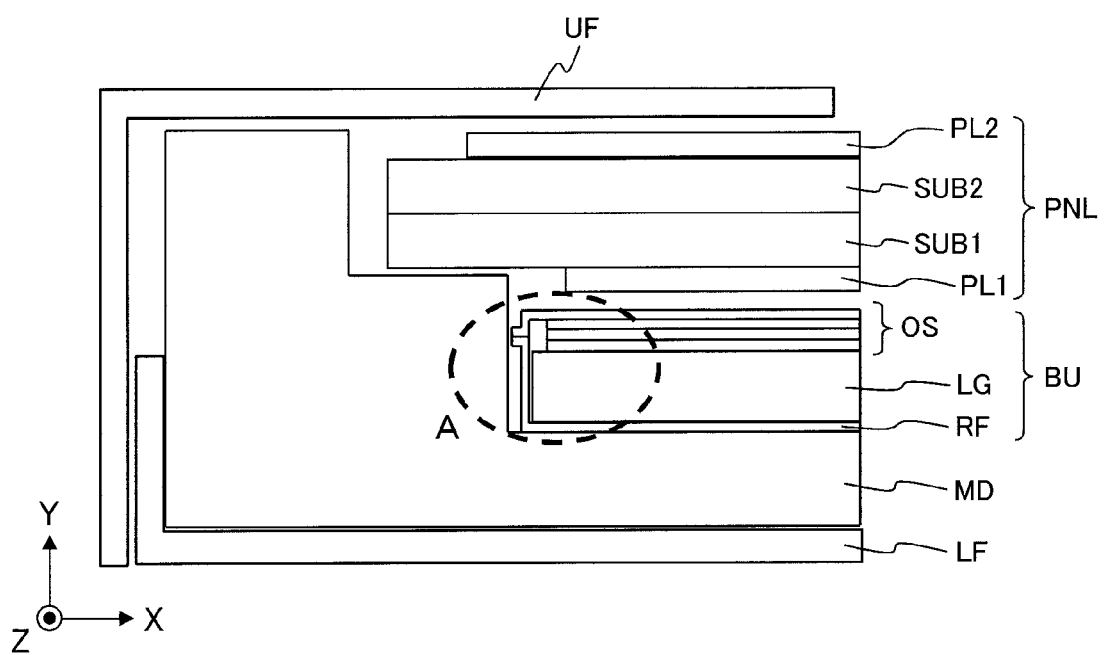
FIG. 1 is a sectional view for schematically illustrating a structure of a liquid crystal display device according to a first embodiment of the invention.

Embodiments to which the invention is applied will hereinbelow be described with reference to the accompanying drawings. In the following description, however, the same or similar reference numerals are used to refer to the same or similar components which are explained only once to avoid repetition.

First Embodiment

FIG. 1 is a sectional view for schematically illustrating a structure of a liquid crystal display device according to a first embodiment of the invention. Referring to FIG. 1, the following description is made on a general structure of the liquid crystal display device of the first embodiment. In the figure, the characters 'X', 'Y' and 'Z' represent X axis, Y axis and Z axis, respectively.

As shown in FIG. 1, the liquid crystal display device of the first embodiment has a structure, for example, where a mold member (mold frame) MD formed of a resin member is disposed in a known lower frame LF which is a metal member shaped like a box open on one side along a side wall. The mold member MD is configured to contain therein a liquid crystal display panel PNL having a rectangular configuration and a backlight device (backlight unit) BU and to retain these at predetermined positions. On opening side of the lower frame LF, or on the side where the liquid crystal display panel PNL and the like are mounted, a known upper frame UF is fitted on the lower frame LF, while the liquid crystal display panel PNL and the backlight device BU are each retained at the predetermined position in conformity to a step part formed in the mold member MD. The liquid crystal display panel PNL of this structure is mounted on an upper step part of the mold member MD as seen in the figure and adapted to be irradiated with backlight beam from the backlight device BU on the back side thereof. As needed, the liquid crystal display device may also have a structure in which the liquid crystal display panel PNL is directly fixed to the mold member MD with a double-faced tape or the like and which does not include the upper frame UF.

In the liquid crystal display device of the first embodiment, the backlight device BU includes a reflection sheet RF, a light guide LG, an optical sheet group OS and an unillustrated light source employing a light emitting diode or the like and has a structure where the reflection sheet RF, the light guide LG and the optical sheet group OS except for the light source are mounted on a bottom side of the mold member MD. On the other hand, the liquid crystal display panel PNL is a known liquid crystal display panel having pixels arrayed in a matrix form in an in-plane direction and includes a first substrate SUB1 formed with known thin-film transistors, pixel electrodes and the like and a second substrate SUB2 formed with color filters of red (R), green (G) and blue (B) and the like. The first substrate SUB1 and the second substrate SUB2 are arranged in face-to-face relation with an unillustrated liquid crystal layer disposed therebetween. The first substrate SUB1 has a polarizing plate PL1 bonded to a lower side thereof as seen in the figure, while the second substrate SUB2 has a polarizing plate PL2 bonded to a front side thereof as seen in the figure.

Similarly to the conventional liquid crystal display device, the liquid crystal display device of the first embodiment also has the structure where the liquid crystal display panel PNL and the backlight device BU are mounted on the step part formed on an inner periphery of the mold member MD while the upper frame UF is fitted on the lower frame LF so that the liquid crystal display panel PNL and the backlight device BU are retained at the predetermined positions. According to the liquid crystal display device of the first embodiment, as will be described hereinlater, a structure is made such that the light guide LG and the optical sheet group OS are disposed (contained) in a bag-like body (sealing body) consisting of the optical sheet and the reflection sheet RF which constitute the backlight device BU of the first embodiment. Thus, the liquid crystal display device of the first embodiment is configured to cover the whole body of the backlight device BU without using an additional member and hence, can implement dust prevention measures for the backlight device BU without lowering the irradiation efficiency of the backlight. What is more, the liquid crystal display device is so made as to eliminate the addition of any other member and hence, can prevent the decrease in production efficiency due to the added member.

Figure 2:
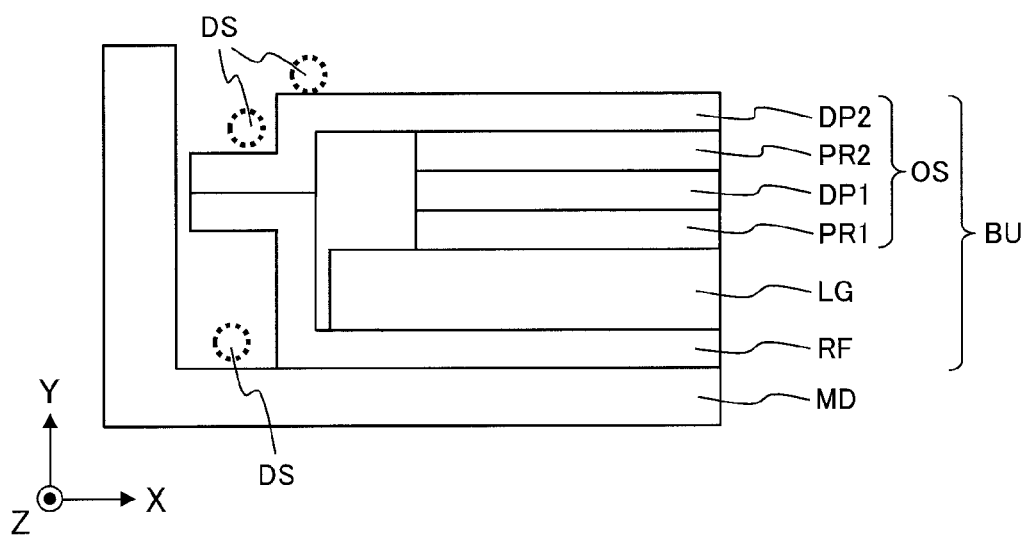
FIG. 2 is a sectional view for illustrating a detailed structure of a backlight device of the liquid crystal display device according to the first embodiment of the invention.

Next, FIG. 2 shows a sectional view for illustrating a detailed structure of the backlight device of the liquid crystal display device according the first embodiment of the invention. Referring to FIG. 2, the detailed structure of the backlight device BU of the first embodiment is described as below. It is noted that the sectional view shown in FIG. 2 is an enlarged view of an encircled area shown in FIG. 1.

As shown in FIG. 2, a sidelight type backlight device BU of the first embodiment also has the structure, for example, where the backlight device BU is retained in the mold member MD. Specifically, the side wall part of the mold member MD is so formed as to enclose the optical sheet group OS, the light guide LG and the reflection sheet RF constituting the backlight device BU, while an inner bottom surface of the mold member MD is formed flat such that the backlight device BU is disposed in the mold member in a manner that the back side of the reflection sheet RF abuts on this inner bottom surface.

According to the structure of the backlight device BU of the first embodiment, the reflection sheet RF of the first embodiment is disposed on the back side of the light guide LG, namely on the side opposite from a side irradiated with a planar light beam. On a surface side (upper side as seen in FIG. 2) of the light guide LG, namely the planar-light irradiation side, a known lower prism sheet PR1, a known lower diffusion sheet DP1, a known upper prism sheet PR2 and an upper diffusion sheet DP2 of the first embodiment are arranged in the order named from the light guide LG, thus constituting the optical sheet group OS. Having this structure, the backlight device of the first embodiment also permits light emitted from the unillustrated known light source (such as the known light emitting diode) to invade the light guide LG from a lateral side thereof and to be emitted as the planar light beam from the surface side of the light guide LG. This planar light beam emitted from the light guide LG is applied as the backlight beam onto the back side of the liquid crystal display panel PNL via the optical sheet group OS.

According to the structure of the backlight device BU of the first embodiment, the upper diffusion sheet (second optical sheet) DP2 which, out of the optical sheet group OS disposed on the surface side of the light guide LG, is disposed at the outermost position or the farthest position from the light guide LG, namely at the closest position to the liquid crystal display panel PNL, and the reflection sheet (first optical sheet) RF disposed on the back side of the light guide LG (in a case where a plurality of optical sheets are disposed on the back side of the light guide LG, one of the plural optical sheets that is disposed at the outermost position or the farthest position from the light guide LG) constitute the bag-like body. According to the structure of the first embodiment, the upper diffusion sheet DP2 and the reflection sheet RF are so formed as to have larger outside configurations than the light guide LG and the other optical sheets of the group OS, while a periphery part of the upper diffusion sheet DP2 and a periphery part of the reflection sheet RF are bonded together to form the bag-like body. The periphery part of the upper diffusion sheet DP2 and the periphery part of the reflection sheet RF can be bonded together by any suitable method selected from fusion bond (thermal compression bond and the like), bonding (pasting) using a known adhesive material such as double-faced tape and sealing material or a known adhesive agent, and the like. An alternative bond part may also be made such that base materials of the upper diffusion sheet DP2 and the reflection sheet RF are exposed at the bond part and the exposed base materials are bonded together. Further, the invention is not limited to the structure where the optical sheet at the uppermost side of the optical sheet group OS and the reflection sheet RF jointly form the bag-like body, in which the light guide LG and the other optical sheets are sealed. In a case where the optical sheet at the uppermost side of the optical sheet group OS is not suited for deformation or thermal bond, for example, the invention may have a structure where the second uppermost one, third uppermost one or the like of the optical sheet group OS and the reflection sheet RF jointly form the bag-like body, in which the optical sheet (s) closer to the light guide LG than the optical sheet forming the bag-like body and the light guide LG are sealed.

Figure 3:
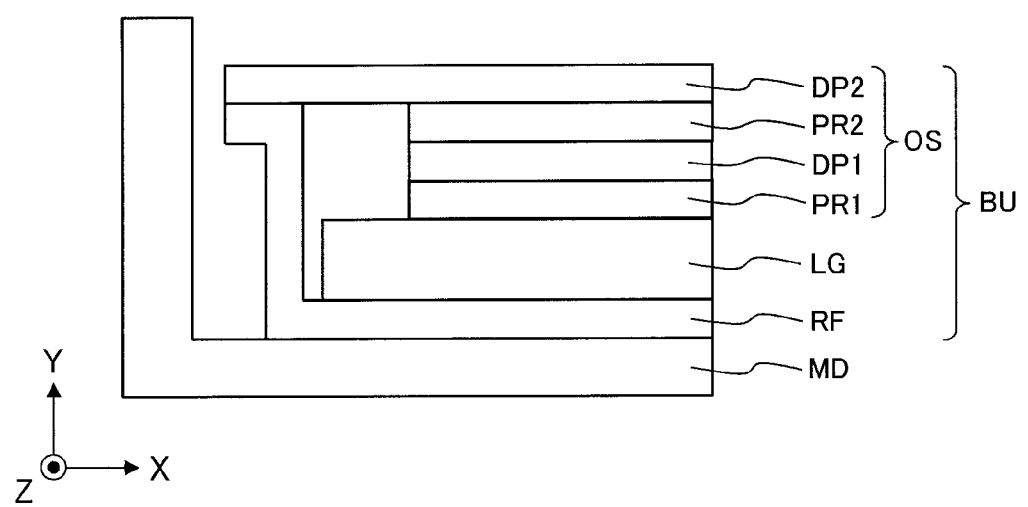
FIG. 3 is a sectional view for illustrating a detailed structure of another backlight device of the liquid crystal display device according to the first embodiment of the invention.

The backlight device of the first embodiment has the structure where the unillustrated light source is fixed to the mold member MD, or is disposed outside of the bag-like body consisting of the upper diffusion sheet DP2 and the reflection sheet RF. Therefore, the backlight device BU of the first embodiment is configured such that the light emitted from the light source is made incident on the lateral side of the light guide LG via the reflection sheet RF disposed to cover the lateral side of the light guide LG. In this case, a structure where the reflection sheet RF is not mirror finished at a region beyond a side end part of the light guide LG (for example, only the base material of the reflection sheet is extended in the region beyond the side end part of the light guide) or a structure where the reflection sheet is formed with a window-like transparent region without mirror finish at a region between the light source and the lateral side of the light guide LG may preferably be adopted in order to ensure that the light emitted from the light source is less attenuated when penetrating the reflection sheet RF. Otherwise, a structure may also be made such that the bond part between the upper diffusion sheet DP2 and the reflection sheet RF is formed at place downward of the lateral side of the light guide LG (on the side of the reflection sheet RF). Similarly to the above, this structure may also preferably employ the diffusion sheet DP2 which is not light-diffusion treated (for example, only the base material is extended) at the region between the lateral side of the light guide LG and the light source. It is noted, however, that the bond part between the upper diffusion sheet DP2 and the reflection sheet RF may more preferably be formed at place close to the upper diffusion sheet DP2 because the upper diffusion sheet DP2 is the last optical sheet penetrated by the planar light beam emitted as the backlight beam and because an effect to reduce the deflection of the reflection sheet RF caused by load posed thereon by the light guide LG and optical sheet group OS which are laid on the reflection sheet RF. Alternatively, as shown in FIG. 3, a structure may be made such that the upper diffusion sheet DP2 is stretched in the in-plane direction thereof while only the reflection sheet RF is bent and stretched in the Y-direction and then is bonded to the upper diffusion sheet DP2. A structure adapted to eliminate the formation of deformed part (bent part) in the upper diffusion sheet DP2 can be obtained by forming the bag-like body shown in FIG. 3. This structure is even more preferred because the upper diffusion sheet DP2 is prevented from suffering change in the optical characteristics due to the occurrence of deflection.

As shown in FIG. 2 and FIG. 3, the above-described structures can prevent the invasion of foreign substance DS such as mote and dust (invading foreign substance) into the bag-like body or into the backlight device BU (can achieve dust prevention) even when the foreign substance DS invades the liquid crystal display device. That is, the structures can prevent the foreign substance DS from invading space between the light guide LG and the reflection sheet RF, between the light guide LG and the lower prism sheet PR1, and between the optical sheets forming the optical sheet group OS. In this case, the foreign substance DS such as mote and dust may invade a backlight irradiation region, which is defined by an upper side of the backlight device BU, namely an upper side of the upper diffusion sheet DP2. On the other hand, the backlight device BU and the liquid crystal display panel PNL are so configured as to maintain a predetermined clearance therebetween. As compared with the foreign substance DS invading the backlight device BU, therefore, the foreign substance DS invading the upper side of the backlight device BU is more likely to fall to a peripheral area or onto the lower side of the display device in conjunction with a position of the main body of the liquid crystal display device (e.g., vertically positioned) or vibrations or the like during use. Therefore, the invention is configured to prevent the invasion of foreign substance DS into the backlight device BU which is disposed downward of the liquid crystal display panel PNL.

Figure 4:
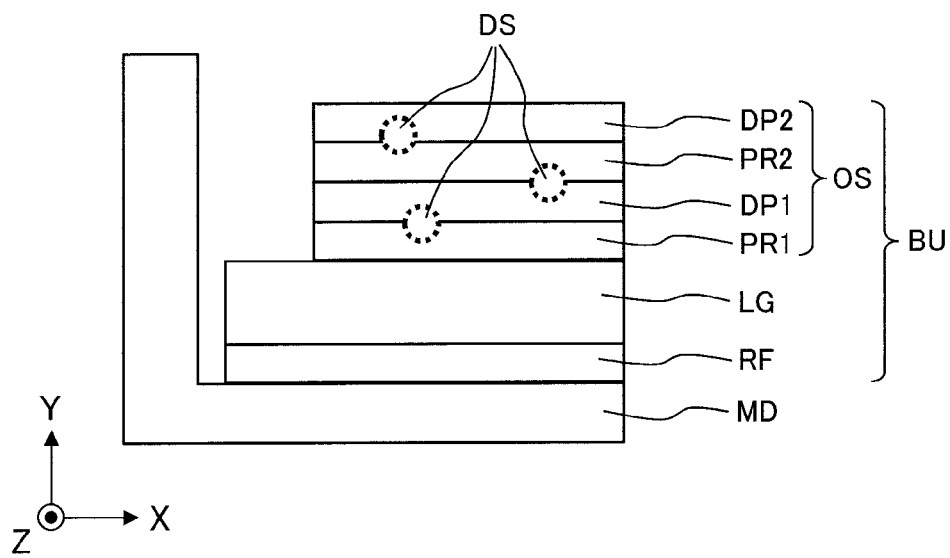
FIG. 4 is a sectional view for illustrating a detailed structure of a conventional backlight device.

On the other hand, as shown in FIG. 4, a conventional backlight device has a structure where the light guide LG is mounted on the upper side of the reflection sheet RF while the lower prism sheet PR1, lower diffusion sheet DP1, upper prism sheet PR2 and upper diffusion sheet DP2 are mounted on the upper side of the light guide in the order named and are exposed at the lateral sides thereof. Hence, the foreign substance DS invading the liquid crystal display device may easily invade space between the optical sheets through the lateral side of the optical sheet group OS. Accordingly, the conventional backlight device applies the backlight beam containing the intercepted light area by the foreign substance DS, resulting in the black spot failure in which the intercepted light area by the foreign substance DS appears as the black spot in the display image.

As described above, the backlight device BU of the liquid crystal display device of the first embodiment has the structure where the optical sheets constituting the backlight device BU are used to form the bag-like body while the light guide LG and the other optical sheets are disposed in the bag-like body. Without adding another component, therefore, the backlight device BU is adapted to prevent the foreign substance DS such as mote and dust invading the liquid crystal display device from invading the backlight device BU. That is, the backlight device can prevent the invading foreign substance DS in the liquid crystal display device from intruding further into the region between the optical sheets of the optical sheet group OS or between the light guide LG and the optical sheet group OS and intercepting the planar light beam emitted from the light guide LG. Thus, the backlight device can apply the backlight beam free from light intercepted by the foreign substance DS. As a result, the backlight device can prevent the black spot failure in which the intercepted light portion by the foreign substance DS appears as the black spot in the display image, the display irregularities and the like, achieving improvement in the display grade of display image, namely the display quality.

Further, the backlight device BU of the first embodiment is configured to form the bag-like body using the optical sheets disposed on the back side and the surface side of the light guide LG. Hence, deflection and the like of the optical sheets forming the bag-like body can be minimized. Accordingly, it is also possible to obtain an extraordinary effect to suppress the deterioration of optical characteristics of the backlight device BU which results from the deflection of the individual optical sheets for sealing the backlight device BU. Particularly in the liquid crystal display device for use as display device in compact personal digital assistant such as represented by smartphone and tablet terminal, the light guide LG and the optical sheet group OS are also formed in a super-thin structure. Therefore, the deflection and the like of the optical sheets can also be minimized when forming the bag-like body. Hence, the backlight device BU can be dramatically reduced in the deterioration of optical characteristics which results from the deflection of the optical sheets forming the bag-like body.

While the backlight device BU of the liquid crystal display device of the first embodiment has been described by way of illustration of the case where the light source is disposed outside of the bag-like body consisting of the upper diffusion sheet DP2 and the reflection sheet RF, the invention is not limited to this. For example, the backlight device may have a structure where the light source is disposed in the bag-like body by adopting a structure to fix the light source to the lateral side of the light guide LG so as to dispose the light source at a predetermined position. In this case, there may be contemplated a method where a through-hole is formed in the bond part between the upper diffusion sheet DP2 and the reflection sheet RF and a signal line for light source (power line) is passed through the through-hole, or a method where the through-hole is formed in either of the upper diffusion sheet DP2 and the reflection sheet RF and the signal line for light source is passed through the through-hole. In this case, the invasion of foreign substance DS such as mote and dust into the bag-like body can be prevented by applying resin seal to the clearance between the through-hole and the signal line.

While the backlight device BU of the liquid crystal display device of the first embodiment has the structure where the bag-like body is formed by bonding together the periphery parts of the light guide LG-side surface of the upper diffusion sheet DP2 and of the light guide LG-side surface of the reflection sheet RF, the invention is not limited to this. In a case where the upper diffusion sheet DP2 and the reflection sheet RF are thermally fusion bonded, surfaces opposite to the fused surface, namely an outside surface of the upper diffusion sheet DP2 and an outside surface of the reflection sheet RF need be both disposed outside of the bag-like body. However, in a case where the upper diffusion sheet and the reflection sheet are bonded together with the adhesive material or the like, it is also possible to bond together the periphery parts of the light guide LG-side surface of the upper diffusion sheet DP2 and of the outside surface of the reflection sheet RF, or the periphery parts of the outside surface of the upper diffusion sheet DP2 and of the light guide LG-side surface of the reflection sheet RF. Hence, such structures may be adopted. In this case, an extraordinary effect can be obtained that the bond portion between the upper diffusion sheet DP2 and the reflection sheet RF can be configured not to project outwardly (outer peripheral direction) from the backlight device BU, namely not to project outwardly from the bag-like body.

While the mold member MD of the liquid crystal display device of the first embodiment has been described by way of illustration of the structure, similar to that of the conventional device, where the opening such as the through-hole is not formed in the bottom of the mold member MD, the invention is not limited to this. For example, the mold member may have a structure where the through-hole is formed on the back side relatively less susceptible to the invasion of foreign substance DS such as mote and dust, namely formed on the side abutted on the lower frame LF. It is noted however that such a structure where the through-hole is formed allows easy invasion of the foreign substance DS into the liquid crystal display device. It is therefore preferred to adopt the structure without the through-hole for the sake of preventing the invading foreign substance DS from adhering to portion between the backlight device BU and the liquid crystal display panel PNL.

Further, the backlight device BU of the liquid crystal display device of the first embodiment has the structure where the upper diffusion sheet DP2 and the reflection sheet RF are bonded together at an intermediate place in the height direction (Y-direction) of the backlight device BU, or place upward of the lateral side of the light guide LG but the invention is not limited to this. For example, the backlight device may also have a structure where the upper diffusion sheet DP2 and the reflection sheet RF can be bonded together at any position in the height direction (Y-direction) of the backlight device BU so long as the bond part does not intercept the light emitted from the light source and becoming incident on the lateral side of the light guide LG.

The mold member MD of the liquid crystal display device of the first embodiment may have a structure where the step part projecting toward the backlight device BU is formed at the side wall part thereof so as to prevent the light guide LG and the optical sheet group OS from moving in the X-direction or Z-direction in the bag-like body. While the description has been made on the case where the light guide LG and the optical sheet group OS to be disposed in the bag-like body are formed to have different widths in the X-direction, the mold member may also have a structure where the light guide LG and the optical sheet group OS are formed to have the same widths in the X-direction and Z-direction. This structure offers an extraordinary effect to prevent the light guide LG and the optical sheet from being displaced from each other in the bag-like body.

Second Embodiment

Figure 5:
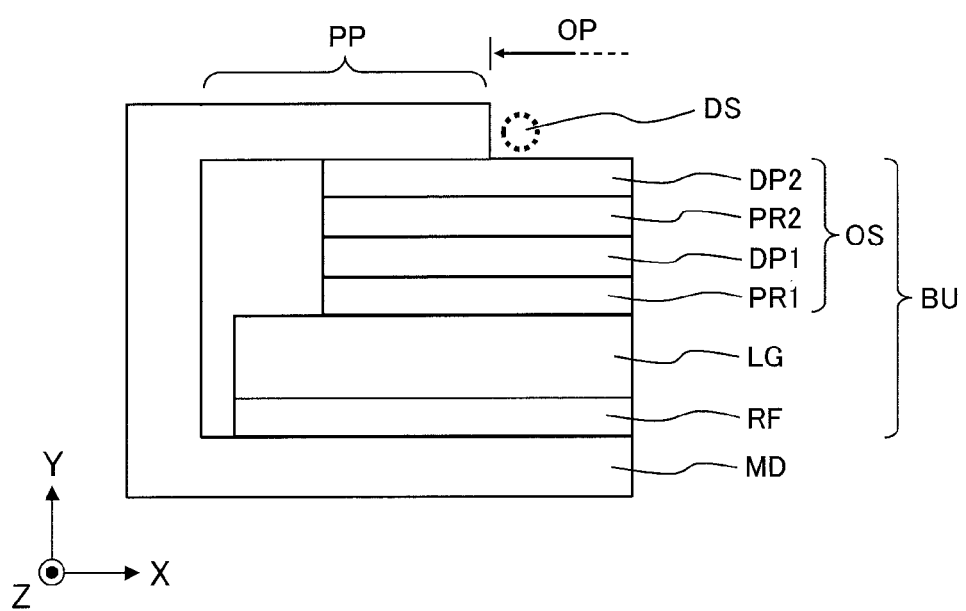
FIG. 5 is a sectional view for illustrating a detailed structure of a backlight device of a liquid crystal display device according to a second embodiment of the invention.
Figure 6:
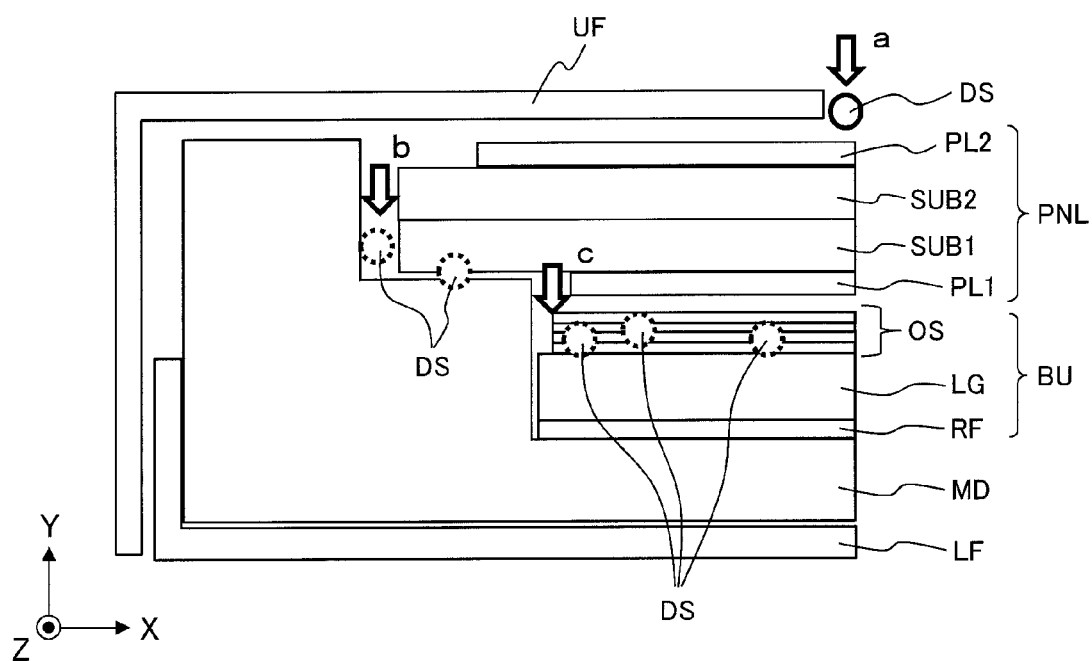
FIG. 6 is a sectional view for schematically illustrating a structure of a conventional liquid crystal display device.
Figure 7:
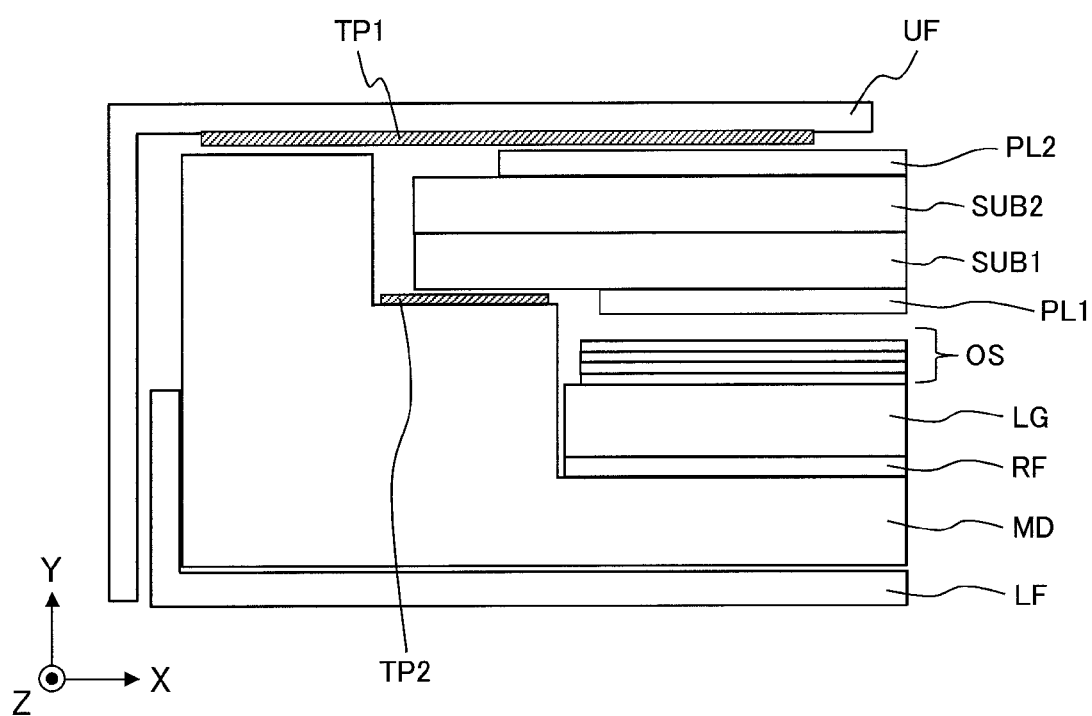
FIG. 7 is a sectional view for schematically illustrating the structure of the conventional liquid crystal display device.

FIG. 5 is a sectional view for illustrating a detailed structure of a backlight device of a liquid crystal display device according to a second embodiment of the invention. The detailed structure of the backlight device BU of the second embodiment will be described as below with reference to FIG. 5. It is noted, however, that FIG. 5 is a diagram corresponding to FIG. 2 of the first embodiment. This backlight device is configured the same way as the backlight device of the first embodiment except that the mold member MD so formed as to cover the backlight device BU, the reflection sheet RF and the upper diffusion sheet DP2 have different structures. In the following description, therefore, the structure of the mold member MD is described in detail.

As apparent from FIG. 5, the backlight device BU of the second embodiment has a structure, similar to that of the conventional backlight device, where the reflection sheet RF has the same outside configuration as that of the light guide LC, namely the reflection sheet RF and the light guide LG are formed to have the same widths in the Y-direction and the Z-direction. Further, the upper diffusion sheet DP2 constituting the optical sheet group OS has the same outside configuration as the other optical sheets. The upper diffusion sheet DP2 and the other optical sheets are formed to have the same widths in the Y-direction and the Z-direction.

On the other hand, as apparent from FIG. 5, the mold member MD of the second embodiment has a structure where a frame-like projecting part PP is formed in a manner to project toward a backlight irradiation region from a side wall of a region where the light guide LG and the like are mounted and to projectingly extend from an upper end (end on the irradiation-surface side) of the side wall toward the irradiation region as enclosing the backlight irradiation region.

Namely, the mold member MD of the second embodiment is formed with the projecting part PP which projects toward the backlight irradiation region from the side wall surface of the region where the reflection sheet RF, light guide LG, and optical sheet group OS forming the backlight device BU are accommodated. Further, at least a wall surface on the backlight-device-BU side (inside wall surface) of the projecting part PP is formed substantially in parallel with an in-plane direction of the optical sheet group OS (inside wall surface at the bottom of the region where the backlight device BU is accommodated) while a peripheral end portion of the projecting part PP is formed along an outer side of the backlight irradiation region. Namely, the mold member MD of the second embodiment has a C-shaped cross-sectional profile, as taken on the X-Y plane or the X-Z plane, which has an opening defined by the backlight irradiation region.

According to this structure, the mold member MD of the second embodiment is formed with an opening OP at a region enclosed by the projecting part PP so that the backlight beam is emitted from the opening OP. In this structure, as shown in FIG. 5, periphery parts of the reflection sheet RF, light guide LG and optical sheet group OS which constitute the backlight device BU, namely outer side parts (outer periphery parts) thereof enclosing the backlight irradiation region overlaps with the projecting part PP. That is, the reflection sheet RF, light guide LG and optical sheet group OS are so formed as to have a larger outside configuration in the X-direction and Z-direction than an outside configuration of the opening OP defined by the projecting part PP. According to the structure of the second embodiment, the upper diffusion sheet DP2 to be located at the uppermost side of the backlight device BU need only have a larger outside configuration than that of the opening OP. In the light of rigidity and the like of the upper diffusion sheet DP2, however, it is preferred that the light guide LG and the other optical sheets are also configured to have the larger outside configurations than the opening OP.

According to the structure of the backlight device BU of the second embodiment, the backlight device BU including the reflection sheet RF, light guide LG and optical sheet group OS is configured to have a Y-height equal to or substantially equal to a Y-height of the inside of the mold member as determined between an inside surface of the projecting part PP and the bottom surface.

Therefore, the backlight device BU of the second embodiment is configured to eliminate clearance between the upper diffusion sheet DP2 disposed at the uppermost side of the optical sheet group OS and the projecting part PP. Therefore, even in the event of the invasion of foreign substance DS such as mote and dust in the peripheries of the mold member MD, this structure can obviate the problem that this foreign substance DS invades the peripheral part of the backlight device BU, intruding further into the clearance between the light guide LG and the optical sheet group OS or between the optical sheets of the group OS. Accordingly, the liquid crystal display device of the second embodiment can also obtain the same effect as the first embodiment without adding another component just as in the first embodiment. The second embodiment can prevent the decrease in display grade due to the black spot failure, display irregularities and the like caused by the invasion of foreign substance DS such as mote and dust into the backlight device BU.

While the backlight device BU of the second embodiment has the structure where the mold member MD and the upper diffusion sheet DP2 are not bonded together, the invention is not limited to this. For example, a structure may be made such that the projecting part PP and the upper diffusion sheet DP2 are annularly adhered (bonded) together at annular overlap parts thereof, as seen in plan, with a known adhesive material such as double-faced tape, sealing material, adhesive agent, or the like. This structure permits the mold member MD and the upper diffusion sheet DP2 to sealingly cover the whole body of the backlight device BU.

According to the structure of the second embodiment as well, similarly to that of the first embodiment, the though-hole is formed in the lateral side of the mold member MD, while the light source is disposed in the through-hole and the clearance is sealed. Otherwise, the light source is disposed in the mold member MD while the signal line (power line) for power supply to the light source is led into the mold member MD via the through-hole or slit formed in the mold member MD and the clearance between the signal line and the through-hole or slit is sealed. In this manner, the invasion of foreign substance DS such as mote and dust into the backlight device BU as a result of the provision of the light source can be obviated.

According to the structure of the backlight device BU of the second embodiment, the invasion of foreign substance DS into the backlight device BU can even be prevented by adopting a configuration where the bag-like member having an opening corresponding to the backlight irradiation region is added; the reflection sheet RF, light guide LG and optical sheet group OS are accommodated in the bag-like member; the upper diffusion sheet DP2 disposed on the outermost side of the optical sheet group OS is bonded to the opening of the bag-like member, and the bag-like member is disposed inside the mold member MD having the conventional configuration.

While the liquid crystal display devices of the first and second embodiments have the structure where the lower prism sheet PR1, lower diffusion sheet DP1, upper prism sheet PR2 and upper diffusion sheet DP2 form the optical sheet group OS, the invention is not limited to this and another optical sheet may be employed as needed. It is noted, however, that the backlight device of the first embodiment is adapted to prevent backlight irregularity caused by the invasion of foreign substance DS such as mote and dust by adopting the structure where the optical sheet disposed on the uppermost side of the optical sheet group OS and the reflection sheet RF form the bag-like body in which the light guide LG and the other optical sheets are retained.

While the invention accomplished by the inventors has been specifically described based on the aforementioned embodiments of the invention, the invention should not be limited to the aforementioned embodiments of the invention and various changes can be made thereto without departing from the scope of the invention.

The invention claimed is:

1. A liquid crystal display device comprising:
    a liquid crystal display panel; and
    a backlight device for irradiating the liquid crystal display panel with a planar backlight beam from a back side of the liquid crystal display panel,
    the backlight device including:
    a light source;
    a light guide which converts light from the light source to the planar light beam and emits the planar light beam;
    an optical sheet disposed on a back side of the light guide; and
    an optical sheet group which is disposed on an irradiation-surface side of the light guide emitting the planar light beam and includes a plurality of optical sheets arranged in stacked relation,
    wherein out of the optical sheets disposed on the back side and the irradiation side of the light guide, at least one first optical sheet disposed on the back side of the light guide and at least one second optical sheet of the optical sheet group disposed on the surface side of the light guide are each formed to have a larger outside configuration than at least the light guide and the other optical sheets,
    periphery parts of the first optical sheet and the second optical sheet are bonded together to form a bag shape, and the light guide and the other optical sheets are retained in the bag-like body formed of the first optical sheet and the second optical sheet, and
    a bonded portion of periphery parts does not overlap the light guide in a plane view from the irradiation-surface side.

2. The liquid crystal display device according to claim 1, wherein the first optical sheet is an optical sheet that is the outermost one of the optical sheets disposed on the back side of the light guide, and
    the second optical sheet is an optical sheet that is the outermost one of the optical sheet group disposed on the surface side of the light guide.

3. The liquid crystal display device according to claim 1, wherein the light source is disposed outside of the bag-like body and the light from the light source is made incident from a lateral side of the light guide via the first optical sheet or the second optical sheet.

4. The liquid crystal display device according to claim 3, wherein the first optical sheet or the second optical sheet includes a light-transmitting window for the light from the light source to penetrate.

5. The liquid crystal display device according to claim 1, wherein the light source is disposed in the bag-like body and a power line for power supply to the light source is connected to the light source via a through-hole formed in a lateral side of the first optical sheet or the second optical sheet, or a through-hole formed in a bond part between the first optical sheet and the second optical sheet.

6. The liquid crystal display device according to claim 2, wherein the light source is disposed in the bag-like body and a power line for power supply to the light source is connected to the light source via a through-hole formed in a lateral side of the first optical sheet or the second optical sheet, or a through-hole formed in a bond part between the first optical sheet and the second optical sheet.

7. The liquid crystal display device according to claim 5, wherein a clearance between the through-hole and the power line is sealed.

8. The liquid crystal display device according to claim 6, wherein a clearance between the through-hole and the power line is sealed.

9. The liquid crystal display device according to claim 1, wherein the first optical sheet and the second optical sheet are bonded together on respective opposed surfaces thereof.

10. The liquid crystal display device according to claim 2, wherein the first optical sheet and the second optical sheet are bonded together on respective opposed surfaces thereof.

11. The liquid crystal display device according to claim 3, wherein the first optical sheet and the second optical sheet are bonded together on respective opposed surfaces thereof.

12. The liquid crystal display device according to claim 7, wherein the first optical sheet and the second optical sheet are bonded together by thermal compression bond.

\* \* \* \* \*